UNITED STATES PATENT OFFICE.

WILHELM GRÜTTEFIEN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

AMINOACIDYLPYROCATECHIN AND PROCESS OF MAKING SAME.

970,042.     Specification of Letters Patent.     Patented Sept. 13, 1910.

No Drawing.     Application filed March 9, 1909.     Serial No. 482,392.

*To all whom it may concern:*

Be it known that I, WILHELM GRÜTTEFIEN, doctor of philosophy, chemist, citizen of the German Empire, residing at Vohwinkel, near Elberfeld, Germany, have invented new and useful Improvements in Aminoacidylpyrocatechins and Processes of Making Same, of which the following is a specification.

I have found that the hitherto unknown dialkylethers of n-phthaliminopropionylpyrocatechins its higher homologues or analogues having the formula:

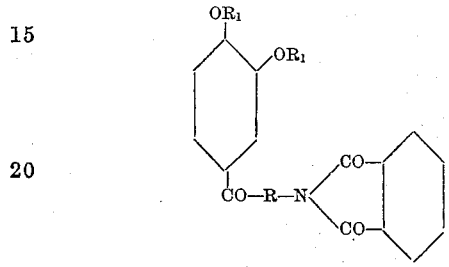

$R_1$ meaning alkyl, R meaning ethylene or higher homologous and analogous radicals *e. g.*

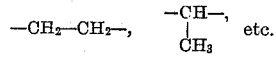

can be obtained by treating dialkyl ethers of pyrocatechin with the chlorids of phthaliminopropionic acids etc. *e. g.* the chlorid of alpha-phthaliminopropionic acid (see *Berichte der Deutschen Chemischen Gesellschaft* 38, p. 634) or beta-phthaliminopropionyl chlorid (see *Berichte der Deutschen Chemischen Gesellschaft* 41, p. 242) etc. in the presence of aluminium chlorid. The new compounds thus obtained yield by saponification the aminoacidylpyrocatechins

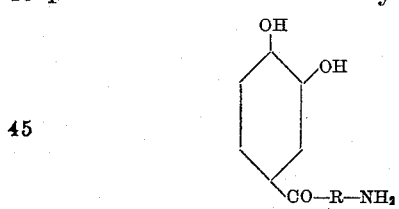

(R having the above-defined meaning) which have the valuable therapeutic property of increasing the blood-pressure in the same way as the substance contained in the suprarenal glands. My discovery affords a new and very useful way of producing new products of this kind.

The reactions take probably place according to the following general formulæ:

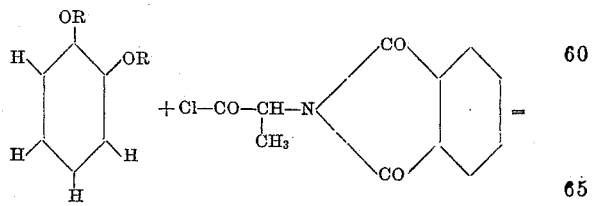

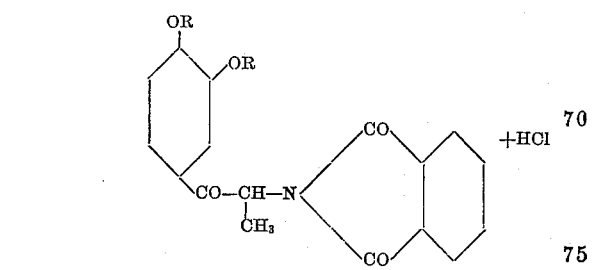

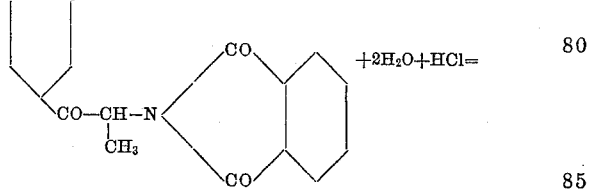

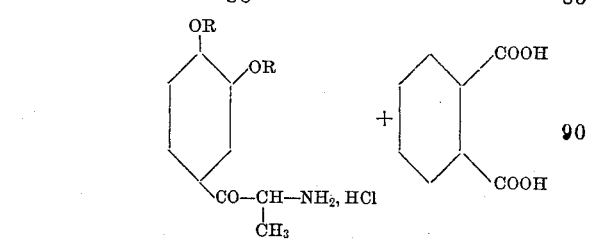

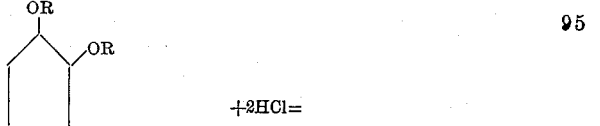

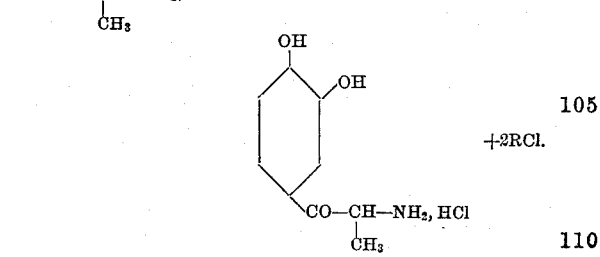

In order to illustrate the new process more fully the following example is given, the parts being by weight:—40 parts of finely powdered aluminum chlorid are added to a mixture of 40 parts of the chlorid of alpha-phthaliminopropionic acid (M. P. 71° C.) and 40 parts of veratrol (dimethyl ether of pyrocatechin). It is heated for half an hour on the water bath until the evolution of HCl ceases. The melt is carefully mixed with ice and hydrochloric acid, warmed on the water-bath and unchanged veratrol is removed by distillation with steam and the residue is then extracted with hot alcohol. The n-phthalimino-alpha-propionylveratrol remains undissolved as a white powder which is collected on a filter. The new product melts at 212° C.

The process is carried out in an analogous manner for the preparation of other n-phthaliminoacidylpyrocatechin ethers defined above.

The new phthaliminobetapropionylveratrol prepared as above melts at 175° C.

Other pyrocatechin ethers or other chlorids of phthalimino acids of the above given formula may be used.

50 parts of phthalimino-alpha-propionyl-veratrol:

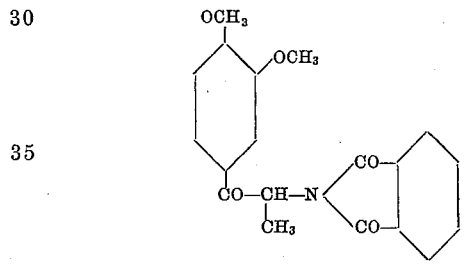

(M. P. 212°) are then heated under a reflux condenser with 200 parts of glacial acetic acid and 150 parts of concentrated hydrochloric acid for about 16 hours until solution is complete. After cooling, 1000 parts of water are added, the solution is extracted with ether to remove impurities and the aqueous solution is evaporated to dryness, stirred up with acetone, filtered off and washed with a small quantity of acetone. The hydrochlorid of alpha-aminopropionyl-veratrol is thus obtained in the shape of white crystals melting at 220° C. In order to split off the methyl groups 5 parts of this product are heated in a closed vessel to 150–170° C. for one hour with 5 parts of a 20 per cent. hydrochloric acid. The liquid is partly evaporated *in vacuo* and the new alpha-aminopropionylpyrocatechin having probably the formula:

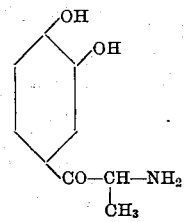

is precipitated by the addition of ammonia.

The new alpha-aminopropionylpyrocatechin is a yellow crystalline powder melting at 212° C. It is scarcely soluble in water and in the ordinary organic solvents. Its hydrochlorid forms faintly reddish leaflets melting at 236° C. Its aqueous solution is colored green by $FeCl_3$. The new beta-aminopropionylpyrocatechin obtainable from beta-phthaliminopropionylveratrol:

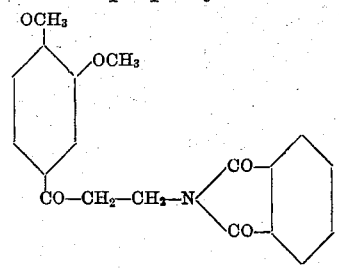

is a grayish-brown crystalline powder having no definite melting point. It is scarcely soluble in water and in organic solvents. The hydrochlorid forms leaflets melting at 240° C. Its solution is colored green by $FeCl_3$.

I claim:

1. The process of producing aminoacidyl-pyrocatechins having probably the following general formula:

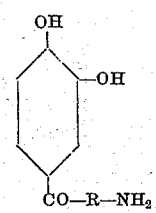

(R having the above defined meaning) which process consists in first treating dialkyl ethers of pyrocatechin with the hereinbefore defined chlorids of phthalimino acids in the presence of aluminium chlorid, then saponifying the resulting products by means of acids and finally isolating the free bases by means of alkali.

2. The process of producing aminopropionylpyrocatechin having probably the following formula:

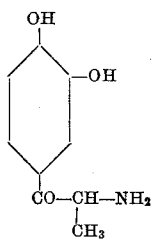

which process consists in first treating the dimethylether of pyrocatechin with the chlorid of alpha-phthaliminopropionic acid in the presence of aluminium chlorid, then saponifying the resulting products by means of acids and finally isolating the free base by means of alkali.

3. The herein-described new aminoacidyl-pyrocatechins having probably the following general formula:

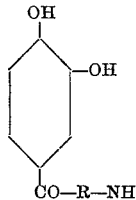

(R having the above-defined meaning), being crystalline powders, very little soluble in water and in organic solvents, forming with hydrochloric acid salts readily soluble in water, the aqueous solutions of these salts yielding with ferric chlorid green colorations, and possessing valuable therapeutic properties, substantially as described.

4. The herein-described aminopropionyl-pyrocatechin having probably the following formula:

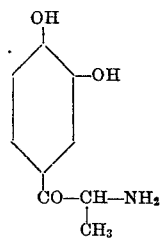

having a melting point of about 212° C., being a yellowish crystalline powder, scarcely soluble in water and in the ordinary organic solvents, its hydrochlorid being in the form of faintly reddish leaflets melting at 236° C., its aqueous solution giving a green coloration with ferric chlorid, possessing valuable therapeutic properties substantially as described.

In testimony whereof I have hereunto set my hand in the presence of two subscribing witnesses.

WILHELM GRÜTTEFIEN. [L. S.]

Witnesses:
  OTTO KÖNIG,
  WILLY KLEIN.